United States Patent [19]

Feinberg

[11] Patent Number: 5,160,788
[45] Date of Patent: Nov. 3, 1992

US005160788A

[54] LAMINATES WITH ADHESIVE LAYERS OF FIRE RETARDANT, MELT STABLE ETHYLENE/CARBOXYLIC ACID COPOLYMER COMPOSITIONS

[75] Inventor: Stewart C. Feinberg, Exton, Pa.

[73] Assignee: E. I. Du Pont de Nemours and Company, Wilmington, Del.

[21] Appl. No.: 860,845

[22] Filed: Mar. 31, 1992

Related U.S. Application Data

[63] Continuation-in-part of Ser. No. 654,132, Feb. 11, 1991, Pat. No. 5,118,746.

[51] Int. Cl.⁵ .............. B32B 7/12; B32B 27/18; B32B 27/30; E04B 101/00
[52] U.S. Cl. ................... 428/344; 52/309.3; 206/524.6; 220/454; 428/354; 428/356; 428/461; 428/463; 428/511; 428/514; 428/516; 428/920
[58] Field of Search ............. 428/344, 354, 356, 461, 428/463, 511, 514, 516, 920; 52/309.3; 206/524.6; 220/454

[56] References Cited

U.S. PATENT DOCUMENTS 5,118,746 6/1992 Feinberg .............. 524/411

Primary Examiner—James C. Cannon

[57] ABSTRACT

A laminated structure comprising at least two non-adhesive layers and at least one adhesive layer wherein the adhesive layer is made of a composition stabilized against thermal crosslinking and consequent reduction of its melt index, comprising a uniform dispersion of antimony oxide in a blend of a matrix polymer which is a dipolymer of ethylene with an ethylenically unsaturated carboxylic acid or a terpolymer of ethylene with an ethylenically unsaturated carboxylic acid and with another ethylenically unsaturated comonomer, carbon dioxide or sulfur dioxide; and organo-halogen fire-retardant; and a stabilizing polymer which is a high melt index copolymer of ethylene with acrylic or methacrylic acid. Such laminated structures include laminates used in packaging and building construction.

17 Claims, No Drawings

LAMINATES WITH ADHESIVE LAYERS OF FIRE RETARDANT, MELT STABLE ETHYLENE/CARBOXYLIC ACID COPOLYMER COMPOSITIONS

CROSS-REFERENCE TO RELATED APPLICATION

This is a continuation-in-part of my application Ser. No. 07/654,132, filed Feb. 11, 1991, now U.S. Pat. No. 5,118,746

FIELD OF THE INVENTION

This invention relates to laminated structures in which at least one adhesive layer is a melt-stable blend of copolymers of ethylene with alpha, beta-unsaturated carboxylic acids, and an antimony oxide/organo-halogen fire retardant system. Such laminates are useful, particularly in packaging of, for instance, electronic goods, or laminates used in building construction, or any other areas where fire retardancy is needed.

BACKGROUND OF THE INVENTION

Ethylene copolymers with alpha, beta-unsaturated carboxylic acids are known to be very good hot-melt adhesives suitable for bonding plastic to metal or to another plastic layer. However, when an antimony oxide/organo-halogen system is incorporated into the ethylene/alpha, beta-unsaturated carboxylic acid copolymer, and the resulting fire-retarded copolymer is exposed to high temperatures, such, for example, as are encountered during extrusion (typically in the range from 200° to 280° C.), the copolymer reacts with the antimony oxide as evidenced by a decrease of the polymer's melt index. Further reduction of melt index occurs on storage. Such lowering of the melt index is undesirable because it leads to more difficult and less uniform processing.

There is, therefore, a great need for a thermally stable fire-retardant ethylene/alpha, beta-unsaturated carboxylic acid copolymer compositions in laminates.

SUMMARY OF THE INVENTION

According to this invention, there is provided a laminate structure comprising at least two non-adhesive layers and at least one adhesive layer, which adhesive layer is made of a fire-retardant composition stabilized against thermal crosslinking and consequent decrease of its melt index, i.e., a melt-stable fire retarded composition comprising a uniform dispersion of antimony oxide, optionally predispersed in a carrier polymer, in a blend of a matrix polymer, an organo-halogen fire-retardant, and a stabilizing polymer. More specifically, the adhesive layer is a composition comprising a blend of;

(i) a matrix polymer E/X/Y, where E is ethylene; X is a $C_3$-$C_7$ alpha, beta-unsaturated carboxylic acid; and Y is selected from the group consisting of $C_1$-$C_{10}$ alkyl esters of $C_3$-$C_7$ alpha, beta-unsaturated carboxylic acids, vinyl esters, vinyl ethers, acrylonitrile, methacrylonitrile, carbon monoxide, and sulfur dioxide; the respective relative weight ratios of the monomers in said E/X/Y copolymer being about 96:4:0 to 40:30:30, and the melt index of said copolymer being about 0.1-100 dg/min;

(ii) a stabilizing polymer of ethylene with an unsaturated carboxylic acid selected from the group consisting of acrylic acid and methacrylic acid having a melt index of at least about 5,000 dg/min, and containing at least about 5 weight percent of carboxylic acid monomer; and (iii) an antimony oxide/organo halogen fire retardant composition, the relative weight ratio of matrix polymer to stabilizing polymer being about 98:2 to about 65:45, the amount of antimony oxide in the blend being about 2 to 20 total weight percent, and the amount of organo-halogen compound in the blend being from about 7 to 55 total weight percent.

DETAILED DESCRIPTION

The matrix polymer useful herein is a copolymer represented by the formula E/X/Y, where E is ethylene; X is a $C_3$-$C_7$ alpha, beta-unsaturated carboxylic acid or mixtures of such acids; and Y, which is optional, is a copolymerizable comonomer or a mixture of other copolymerizable comonomers selected from the group consisting of $C_1$-$C_{10}$ alkyl esters of $C_3$-$C_7$ alpha, beta-unsaturated carboxylic acids, vinyl esters, vinyl ethers, acrylonitrile, methacrylonitrile, carbon monoxide, and sulfur dioxide; wherein the respective relative weight ratios of the monomers in said E/X/Y copolymer is about 96:4:0 to 40:30:30, and the melt index of said copolymer, determined according to ASTM D1238, Condition E, is about 0.1-100 dg/min. Preferred matrix dipolymers are dipolymers of ethylene with methacrylic acid (X is methacrylic acid and Y is absent) and especially those in which the weight proportion of methacrylic acid is about 3-30%, preferably 4-15% by weight. Preferred matrix terpolymers are terpolymers of ethylene in which X is methacrylic acid and Y is vinyl acetate, n-butyl acrylate, or isobutyl acrylate.

The stabilizing polymer useful herein (also referred to herein as acid wax) is a high melt index copolymer of ethylene with an unsaturated carboxylic acid selected from the group consisting of acrylic acid (E/AA copolymer) and methacrylic acid (E/MAA copolymer), said high melt index copolymer having a melt index of at least about 5,000 dg/min, preferably at least 10,000 dg/min, determined according to ASTM D1238, condition E, and containing at least about 5 weight percent, preferably at least 9 weight percent, of carboxylic acid monomer. A minor amount of third monomer such as those described above for the matrix polymer can be present provided the appropriate M.I. level is retained. It is generally preferred to choose the type and amount of the stabilizing polymer such that the resulting initial melt index of the composition is close to the melt index of the matrix polymer itself. This objective can be approached with moderate amounts, 15% or less, of stabilizing polymer.

The relative weight ratio of matrix polymer to stabilizing polymer is about 98:2 to 65:35. The amount of stabilizing polymer is also dependent on the level of antimony oxide present, ranging from 1:10 to 10:1 stabilizing polymer:antimony oxide. The amount of antimony oxide in the blend is about 2 to 20 weight percent. The amount of the organo-halogen compound halogen source is about 7 to about 55 weight percent, preferably 10 to 30 weight percent. The optional carrier polymer in which antimony oxide may be predispersed is present up to about 30 weight percent of the combined weight of antimony oxide and carrier polymer. The level of the fire-retarding additives is dependent on the amount of fire-retardancy desired.

The composition may be further compounded to incorporate minor amounts of conventional additives such as, e.g., stabilizers, antioxidants, and slip improving agents. It can be additionally formulated with further additives such as, for example, plasticizers and supplemental fire retardants such as zinc borate, the total amount of plasticizers, if present, being no more than about 15 weight percent, but preferably 5-15 weight percent of the final composition, and the amount of supplemental fire-retardants, if present, being no more than 10 weight percent of the final composition.

The E/X/Y matrix copolymers suitable in the process of the present invention as defined above are available commercially or can be made according to known processes from readily available monomers. Copolymers of ethylene with unsaturated carboxylic acids are described in U.S. Pat. Nos. 4,351,931 to Armitage, 4,252,954 to Chatterjee, 3,264,272 to Rees, 3,520,861 to Thomson et al., 3,884,857 to Ballard et al., and 3,658,741 to Knutson et al. Terpolymers of ethylene with unsaturated carboxylic acids and with alkyl esters of unsaturated carboxylic acids are described in U.S. Pat. No. 3,264,272 to Rees; terpolymers of ethylene with carbon monoxide and unsaturated carboxylic acids are disclosed in U.S. Pat. No. 3,780,140 to Hammer, while terpolymers with sulfur dioxide and unsaturated carboxylic acids are described in U.S. Pat. No. 3,684,778 to Hammer. Various ethylene copolymers with methacrylic acid are sold by E. I. du Pont de Nemours and Company under the trade name NUCREL ®. Carboxylic acids, in addition to acrylic, methacrylic, and higher unsaturated monocarboxylic acids, also include monoesters of alpha, beta-unsaturated dicarboxylic acids such as, e.g., maleic, fumaric, and itaconic acids. Typical alkyl esters of alpha, beta-unsaturated carboxylic acids include methyl, ethyl, butyl, pentyl, hexyl, octyl, and decyl esters, both linear and branched, as well as diesters of dicarboxylic acids. The term matrix polymer can include mixtures of polymers as defined in this paragraph.

High melt index stabilizing copolymers as defined above are available, for example, from Allied Signal Corporation under the trademark A-C ® Copolymers (E/AA copolymers). Such copolymers also can be made according to known methods, e.g., according to similar known methods. They may be made according to the general disclosure of U.S. Pat. No. 3,264,272 to Rees.

Fire retardant systems which are based on the combination of antimony oxide and organo-halogen compounds are well known in the art. Typically the ratio of organo-halogen to antimony oxide is from 6:1 to 1:1, most preferably 4:1 to 2:1. Antimony oxide is available from several sources, including PPG Chemicals, Asarco, Harshaw and others. They may be in powder form, or may be predispersed in a minor amount of a carrier polymer. Predispersions of antimony oxide in a carrier polymer are increasingly used because antimony oxide itself has carcinogenic properties and carrier polymer prevents inhalation of antimony oxide dust. The carrier polymer may also aid in uniform dispersion of the antimony oxide, since it is already uniformly predispersed. Either may be used in the present invention, but predispersed grades are preferred for health reasons. Typical of such predispersed grades, and a grade found highly suitable for use with the acid copolymers of the present invention is Fireshield, FSPO 405 which is a dispersion of antimony oxide in low density polyethylene manufactured by PPG chemicals. A listing of many grades of antimony oxide suitable in the present invention, both predispersed and not predispersed may be found in the Modern Plastics Encyclopedia. The polymer in which the antimony oxide may be predispersed is referred to herein as a carrier polymer. Such carrier polymers for antimony oxide may be present at levels of up to 30 weight percent of the antimony oxide/carrier polymer dispersion. In the final blends of the present invention, the carrier polymer will, if present, be no more than about 3 weight percent of the final composition.

The organo-halogen compound is a halogen source which reacts with antimony oxide. A large number of suitable organo-halogen compounds are available commercially, and include organo-bromine and organo-chlorine compounds. Such compounds are available from Saytech, Dow Chemicals, Ferro Corporation, Hooker, and many others. The most effective compound may vary depending on the exact nature of the polymer being flame retarded, but may be readily determined. Suitable brominated organic compounds include tetradecabromo diphenoxybenzene available as Saytex 120, ethylene-bis (tetrabromophthalimide) available as Saytex BT93 and pentabromoethyl benzene available as 105, all available from Saytech Corporation. Many other halogenated organic compounds may be suitable. A listing of such compounds is given in the Modern Plastics Encyclopedia.

While the primary fire retardant system incorporated into the blends of this invention is a mixture of antimony oxide and an organo-halogen compound, it is possible in addition to add various other fire-retardants to supplement the fire-retardant behavior of the blend. For instance, zinc borate is reputed to lessen the amount of antimony oxide required in an antimony oxide/organo-halogen system. Fire-retardancy is a complex property of a material, and other fire-retardants of varying kinds, added in relatively small amounts may have an advantageous effect on the overall fire-retardant behavior. Such additional fire-retardants are referred to herein as supplemental fire-retardants. They may include any of the many fire-retardant types commonly available. Lists of such materials are described in Modern Plastics Encyclopedia.

In preparing blends of the stabilized fire-retarded polymers of this invention typical extrusion blending techniques may be used commercially, while for experimental quantities, various mixing devices are available, such as a Haake mixer. In the blends prepared in the examples, all ingredients—the matrix polymer or mix of matrix polymers, the stabilizing polymer, antimony oxide dispersion organo-halogen compound and any other additives were added to the blending equipment at the same time. It is possible, however, to prepare concentrates of various materials first, and then 'let-down' as required. Thus it is possible to prepare a concentrate of antimony oxide in the stabilizing polymer, or the stabilizing polymer in the matrix polymer and so forth. However, since it is common for health reasons to predisperse antimony oxide in a carrier polymer, the need to disperse powdery materials using the well known masterbatch techniques then becomes less important. Such 'Masterbatch' techniques are however useful in dealing with differing viscosities of polymeric components.

Laminates of the present invention comprise a substrate, for example, plywood, plastic and plastic composite sheets and films, kraft paper and metal sheets and foils. Such laminates are useful in packaging, especially for electronic goods and in building construction. These laminates can be prepared by many different ways as is known to those skilled in the art, such as film casting, multi-layer blow molding, compression molding, coextrusion, and extrusion lamination. In making these laminate structures, the fire retarded acid copolymer resin may be provided in two forms: (1) It may first be formed into a sheet by blown film extrusion or calendaring. It is then, in a second, distinct step, rolled and pressed onto a polymer substrate; or (2) It may be supplied as pellets or in some similar form and then extruded to form a sheet in contact with various substrate layers.

Film casting is a continuous process by which a thermoplastic material is melted and extruded through a slot die onto a chill roll where it is quenched and resolidified. The resulting film is stripped from the chill roll and wound for further processing or converting. Most cast films goes into lamination, printing, and packaging. In the cast film process, the molten polymer normally exits the extruder vertically through a slot die and tangentially contacts a chill roll that cools the material into a web. Extrusion lamination is an adaptation of this film casting technique wherein the film is cast onto a substrate such as kraft paper, aluminum foil, polyester film, or LDPE film. When used as a tie layer in multi-layer structures prepared by this technique, the fire retarded acid copolymer of the present invention is cast between two or more substrates. Typical structures thus would be: (1) aluminum foil//tie layer//polyolefin; and (2) heat seal layer//aluminum foil//tie layer//polyolefin.

Film casting is one of the two most common processes for producing films of thermoplastic materials. The other method is blown film extrusion. In this method, a molten tube of polymer is simultaneously drawn axially and expanded radially from an annular slit die. The hot tube is cooled by high velocity air from an air ring on the outside and sometimes on the inside of the tube as well. Normally, in this process, the tube is formed and drawn in a vertical and upward direction.

In multi-layer blow molding, multi-layer structures are formed through coextrusion. Two to seven individual extruders feed the components into a coextrusion head, where a multilayer hollow tube (parison) is extruded. This parison is captured at regular intervals in vertically positioned molds. Thereafter, the hot plastic material is blown with air to expand the configuration of the mold cavity, thus forming the final container shape. The continuously extruded parison is cut during the process. The container necks may be completely finished through calibration, and all flash is removed by trimming. The fire retarded acid copolymer compounds of the present invention can be used in multi-layer blow molding as tie layers in structures such as ethylene vinyl alcohol copolymer//adhesive tie layer//high density polyethylene or polypropylene.

Compression molding is the simplest film production/molding technique. The apparatus, or molding press, basically consists of two platens that close together, applying heat and pressure to mold material into the desired shape. The platens typically move up and down on four corner posts under pressure that can reach up to 1,000 tons. Platens can range in size up to 5 ft. square. It a typical application, using the fire retarded acid copolymer of the present invention, a laminate composed of three sheets of the following structure is used:

aluminum foil//fire retarded acid copolymer//clear polyester The two outer layers are higher melting than the inner layer. Pressure and heat sufficient to melt and activate only the inner layer and bond to the two outer layers, such as 200° C., are applied. Thus a three layer laminate, molded into the desired shape, is obtained.

Applications and constructions based on laminates utilizing the fire retarded acid copolymer compound (FRAC), and prepared by one or more of the above processes include the following:
1. Reflective foil insulation:
aluminum foil//FRAC//kraft paper//FRAC/aluminum foil,
2. Fire Retarded packaging:
FRAC//aluminum foil//FRAC//polyolefin.

This invention is now illustrated by the following examples of certain preferred embodiments thereof, where all parts, proportions, and percentages are by weight unless otherwise indicated.

The antimony oxide used in all the examples was FSPO 405, an 80/20 blend of antimony oxide in low density polyethylene which is a product of PPG Chemicals.

The acid wax stabilizing polymer used in all examples was AC 143, and 82/18 by weight ethylene/acrylic acid copolymer with a melt index of greater than 15000, available from Allied-Signal, Incorporated. This is one of many such acid waxes available. It has the preferred combination of high melt index and high acid content.

Small quantities of material, about 50 g, were melt-compounded using a Haake System 40 Mixer fitted with roller-blade rotors. Samples were prepared for this mixer by dry blending the various powders and pellets and charging the total slowly to the mixer. The compounds were mixed in the Haake mixer at the required temperature for 3 minutes at 15 RPM, then for 7 minutes at 50 RPM. Melt temperatures are shown in the Table II.

Larger quantities of dry blend were compounded on a Werner and Pfleiderer corotating twin screw extruder using either a 28 mm trilobal or a 30 mm bilobal screw configuration. The temperature profiles etc. used were as follows:

| 30 mm. Extruder | | | | | | |
|---|---|---|---|---|---|---|
| Zone #1 | Zone #2 | Zone #3 | Zone #4 | Die | RPM | Output |
| 130 | 180 | 230 | 275 | 275 | 250 | 15 pph |

| 28 mm. Extruder | | | | | | |
|---|---|---|---|---|---|---|
| Zone #1 | Zone #2 | Zone #3 | Zone #4 | Zone #5 | Die | RPM |
| 130 | 180 | 230 | 265 | 265 | 250 | 250 |

Temperatures are in degrees Celsius.

Melt index (MI) was determined, according to ASTM D1238, condition E, which requires a temperature of 190° C. and a 2,160 g weight.

Tables I describes the various matrix copolymers used in the course of the experimental work reported herein.

TABLE I

| ETHYLENE/METHACRYLIC ACID MATRIX COPOLYMERS | | | |
|---|---|---|---|
| | M1 | M2 | M3 |
| Acid Content (%) | 9.0 | 10.5 | 9.0 |

TABLE I-continued

| ETHYLENE/METHACRYLIC ACID MATRIX COPOLYMERS | | | |
|---|---|---|---|
| | M1 | M2 | M3 |
| Melt Index (dg/min) | 10 | 35 | 60 |

CONTROL EXAMPLES CT1 TO CT5 AND COMPARATIVE EXAMPLES C1 TO C5

Comparative examples C1 to C5 shown in Table II illustrate the large decrease in melt index which occurs when several different matrix copolymers are blended in a Haake mixer with antimony oxide and organo-bromine compounds. There is between a 50 and 100 fold decrease in melt index, indicating a strong reaction which suggests some form of crosslinking. By comparison, for control purposes, when the matrix polymers are blended under similar conditions with organo-bromine compounds alone, or with zinc borate (another commonly used fire retardant) the change in melt index is only a little over two fold, as seen in Control examples Ct1 to Ct5. When measured two weeks later, the melt index for these remains about the same.

melt index of the product after standing for extended periods of time. In examples 1 to 3, the level of antimony oxide is 5% or below with a corresponding amount of organo-halogen compound within the preferred ratios as noted above. Example 1 has the lowest level of fire retardant and 10% stabilizer, and this shows the least reduction in melt index and excellent stability. Examples 2 and 3 with higher levels of fire retardants and lower levels of stabilizer show a greater reduction in melt index, but still not the drastic reduction seen in comparative examples C4 and C5. The melt index does not decrease further on standing for a prolonged time.

In examples 4 and 5 very high levels of both antimony oxide and total fire-retardant are used, a preferred embodiment, where very high levels of fire-retardancy is required. High levels of stabilizer are also used. It can be seen that the melt index measured initially after preparation of the material is reduced, but again, not to the same extend as in comparative examples C2 and C3 with high levels of flame retardant and no stabilizer. However, after standing, the reduction is mitigated somewhat.

Examples 6 to 9 show that if the melt temperature of mixing is kept lower, very effective stabilizing can be

TABLE II

| BLENDS WITHOUT STABILIZER | | | | | | |
|---|---|---|---|---|---|---|
| Example No. | Matrix, % | Org-Hal, % | % Sb$_2$O$_3$ | Other | Melt | MI, time |
| C1 | M1, 70 | S1, 22.5 | 7.5 | — | 280° C. | .26, init |
| C2 | M1, 50 | S2, 37.5 | 12.5 | — | 280° C. | .14, init |
| C3 | M3, 50 | S2, 37.5 | 12.5 | — | 280° C. | .28, init |
| C4 | M3, 50 | S1, 45 | 5.0 | — | 280° C. | .17, init |
| C5 | M2, 50 | S1, 45 | 5.0 | — | 280° C. | .37, init |
| CT1 | M1, 50 | S1, 50 | — | — | 280° C. | 3.9, init |
| | | | | | | 3.7, 2 wks |
| CT2 | M1, 70 | S1, 30 | — | — | 280° C. | 5.0, init |
| | | | | | | 5.5, 2 wks |
| CT3 | M1, 50 | S1, 37.5 | — | ZB, 12.5 | 280° C. | 3.4, init |
| | | | | | | 4.0, 2 wks |
| CT4 | M1, 70 | S1, 22.5 | — | ZB, 7.5 | 280° C. | 5.3, init |
| | | | | | | 6.9, 2 wks |
| CT5 | M1, 85 | S2, 15 | — | — | 200° C. | 11.1, init |
| | | | | | | 10.7, 2 wks |

S1. Saytex BT-93;
S2. Saytex 120;
ZB. Firebrake ZB zinc borate from U.S. Borax used as a supplemental fire retardant.
*% Sb$_2$O$_3$ refers to weight percent of predispersed antimony oxide which is a dispersion of 80% antimony oxide in LDPE. The actual concentration based on pure antimony oxide is thus correspondingly lower.

EXAMPLES 1 TO 9

The following examples illustrate the effectiveness of the acid wax stabilizer both in preventing a large reduction in melt index in the product as formed, and in the achieved, even to the point of being able to achieve viscosities close to the viscosity of the matrix copolymer (MI=10). Of course, the problem is not as severe in the first place at this temperature, as illustrated by comparative example C6.

TABLE III

| MELT STABILIZER BLENDS | | | | | | |
|---|---|---|---|---|---|---|
| Example No. | Matrix, % | Org Hal, % | % Sb$_2$O$_3$ | % Stab | Prep Mode Melt Temp | MI, time |
| 1 | M1, 79.5 | S2, 8 | 2.5 | 10.0 | 28 mm Extr. 276° C. | 4.0, init 5.0, 2 wks |
| 2 | M1, 62.5+ M2, 16.9 | S2, 15 | 3.8 | 1.8 | 28 mm Extr. 293° C. | 1.2, init 2.5, 2 wks 2.7, 2 mo |
| 3 | M1, 66.7+ M2, 6.6 | S2, 15 | 5.0 | 6.7 | 28 mm Extr. 284° C. | 1.2, init 2.6, 2 wks 3.5, 2 mo |
| 4 | M2, 35 | S1, 40 | 10.0 | 15.0 | 30 mm Extr. 281' C. | 1.3, init 8.7, 2 wks 14.2, 2 mo |
| 5 | M2, 30 | S1, 50 | 10.0 | 10.0 | 28 mm Extr. 344° C. | 0.8, init 6.8, 2 wks 10.2, 2 mo |
| 6 | M1, 75 | S2, 15 | 5.0 | 5.0 | Haake 200° C. | 6.8, init 5.2, 2 wks |

TABLE III-continued
MELT STABILIZER BLENDS

| Example No. | Matrix, % | Org Hal, % | % Sb$_2$O$_3$ | % Stab | Prep Mode Melt Temp | MI, time |
|---|---|---|---|---|---|---|
| 7 | M1, 70 | S2, 15 | 5.0 | 10.0 | Haake 200° C. | 8.6, init 8.8, 2 wks |
| 8 | M1, 65 | S2, 15 | 5.0 | 15.0 | Haake 200° C. | 14.8, init 16.2, 2 wks |
| 9(1) | M1, 65 | S2, 10 | 5.0 | 15.0 | Haake 200° C. | 8.4 init 10.4, 2 wks |
| C6 | M1, 80 | S2, 15 | 5.0 | — | Haake 200° C. | 3.6, init 3.2, 2 wks |

S1, S2 same as Table II.
% Sb$_2$O$_3$ same as Table II.
(1) Composition 9 contains additionally 5 weight percent of a supplemental fire-retardant, Firebrake ZB, zinc borate manufactured by U.S. Borax Co.

LAMINATION EXPERIMENTS

The examples presented below are not meant to limit the types of laminate structures or the number of layers in such structures which can be made using the current invention. Substrates used may be primed or unprimed using methods or chemicals commonly known in the art.

Flammability of the laminate structures was evaluated using ASTM standard test method D568, "Rate of Burning and/or Extent and Time of Burning of Flexible Plastics in a Vertical Position".

Compositions of the two fire retarded acid copolymer compounds were as follows:

|  | Compound #1 | Compound #2 |
|---|---|---|
| E/MAA copolymer (Note 1): | 73.3% | — |
| E/MAA copolymer (Note 2): | — | 73.3% |
| E/AA copolymer, (Note 3) | 6.7% | 6.7% |
| Organo-Halogen, S2 (Note 4): | 15.0% | 15.0% |
| Antimony Oxide (Note 5): | 5.0% | 5.0% |

Notes:
Note 1: 4% MAA, MI = 11
Note 2: 6% MAA, MI = 9
Note 3: 18% AA, MI > 15,000
Note 4: As described in Table II
Note 5: As described in Table II

Example 1: Extrusion Lamination

The two compounds described above were extruded and laminated onto untreated 12.7 micrometer thick aluminum foil or 127 micrometer thick high density polyethylene (HDPE) non-woven web using a 6.35 cm Egan Laminator Coater. The extruder was fitted with a two-stage mixing screw having a length-to-diameter (L/D) ratio of 24/1. Each sample was extruded through a 61 cm wide ER-WE-PA coat hanger die with an 864 micrometer slit opening. Polymer melt temperatures ranged from 230° to 260° C. The extruded polymer films were laminated to the substrates using a matte finish chill roll.

The following structures were prepared and tested according to ASTM D568:

| Structure | ASTM D568 Results |
|---|---|
| 1. Al Foil//Compound #1//HDPE | Pass |
| 2. Al Foil//Compound #2//HDPE | Pass |
| 3. Extruded Compound #2 onto Sample 2 to give the following structure. |  |
| Compound 2//Al Foil//Compound 2//HDPE | Pass |

Example 2: Compression Molded Laminates

Laminates containing fire retarded acid copolymer composition Compound 1, above were also prepared on a melt press under the following conditions: 155° C., 4 ton ram force for 1 minute, then removed and quenched at room temperature. 1"×12" samples were cut and tested according to ASTM D568. Two acid copolymers were used to simulate a heat seal layer which would be used in the actual end use application. They are described in the table. As in Example 1, the HDPE film was 127 micrometers thick and the aluminum foil was 12.7 micrometers thick. Results are shown below.

| Structure (film thickness, micrometer) | ASTM D568 Results |
|---|---|
| 1. HDPE//Compound 1//Al Foil//EAA1 (51-76) (19) | Fail |
| 2. HDPE//Compound 1//Al Foil//EMAA1 (25) (19) | Fail |
| 3. HDPE//Compound 1//Al Foil//EAA1 (102-127) (19) | Fail |
| 4. HDPE//Compound 1//Al Foil//EMAA1 (203-254) (19) | Fail |
| 5. HDPE//Compound 2//Al Foil//EMAA1 (203-254) (19) | Fail |
| 6. HDPE//Compound 1//Al Foil//Compound 1//EAA1 (51) (51) (51) | Pass |

Notes:
EAA1: 81/9:E/AA, MI = 10.5
EMAA1: 88/12:E/MAA, MI = 13.5

The results indicate the aluminum foil acts as a "fire stop": and prevents the fire retarded acid copolymer composition on one side of the foil from extinguishing the burning of a resin on the other side of the foil. Therefore, for maximum effectiveness in constructing a fire resistant packaging, the fire retarded acid copolymer composition should be on both sides of the aluminum foil.

I claim:

1. A laminated structure comprising at least one nonadhesive layer and at least one adhesive layer, in which the adhesive layer is made of a composition comprising a blend of
  (i) a matrix polymer E/X/Y, where E is ethylene; X is a $C_3$-$C_7$ alpha, beta-unsaturated carboxylic acids; and Y selected from the group consisting of $C_1$-$C_{10}$ alkyl esters of $C_3$-$C_7$ alpha, beta-unsaturated carboxylic acids, vinyl esters, vinyl ethers, acrylonitrile, methacrylonitrile, carbon monoxide, and sulfur dioxide; the respective relative weight ratios of the monomers in said E/X/Y copolymer being about 96:40:0 to 40:30:30, and the melt index of said copolymer being about 0.1-100 dg/min;

(ii) a stabilizing polymer of ethylene with an unsaturated carboxylic acid selected from the group consisting of acrylic acid and methacrylic acid having a melt index of at least about 5,000 dg/min, and containing at least about 5 weight percent of carboxylic acid monomer; and (iii) an antimony oxide/organo halogen fire retardant composition, the relative weight ratio of matrix polymer to stabilizing polymer being about 98:2 to 65:45, the amount of antimony oxide in the blend being about 2 to 20 weight percent, and the amount of organo-halogen compound in the blend being from about 7 to 55 weight percent.

2. The laminated structure of claim 1 wherein the melt index of the stabilizing copolymer is at least 10,000 dg/min.

3. The laminated structure of claim 1 wherein the amount of carboxylic acid monomer in the stabilizing copolymer is at least 9 weight percent.

4. The laminated structure of claim 2 wherein the amount of carboxylic acid monomer in the stabilizing copolymer is at least 9 weight percent.

5. The laminated structure of claim 1 which is further compounded to incorporate minor amounts of one or more additives selected from the group consisting of stabilizers, antioxidants, and slip improving agents.

6. The laminated structure of claim 5 which is additionally formulated with one or more additives selected from the group consisting of plasticizers and supplemental fire-retardants, the total amount of plasticizers, if present, being no more than about 15 weight percent of the final compositions; and the amount of supplemental fire-retardant being from about 0 to 10 weight percent of the final composition.

7. The laminated structure of claim 1 wherein the E/X/Y copolymer is a dipolymer of ethylene with methacrylic acid, wherein methacrylic acid is present in an amount of 3-30 weight percent, and Y is present in an amount of 0 weight percent.

8. The laminated structure of claim 7 wherein the amount of methacrylic acid is 4-15 weight percent.

9. The laminated structure of claim 2 wherein the E/X/Y copolymer is a dipolymer of ethylene with methacrylic acid, wherein methacrylic acid is present in an amount of 3-30 weight percent, and Y is present in an amount of 0 weight percent.

10. The laminated structure of claim 9 wherein the amount of methacrylic acid is 4-15 weight percent.

11. The laminated structure of claim 1 wherein the E/X/Y copolymer is a dipolymer of ethylene with acrylic acid, wherein acrylic acid is present in an amount of 3-30 weight percent, and Y is present in an amount of 0 weight percent.

12. The laminated structure of claim 1 wherein the E/X/Y copolymer is a terpolymer of ethylene in which X is methacrylic acid, and Y is selected from the group consisting of vinyl acetate, n-butyl acrylate, and isobutyl acrylate.

13. The laminated structure of claim 1 wherein the E/X/Y copolymer is a terpolymer of ethylene in which X is acrylic acid, and Y is selected from the group consisting of vinyl acetate, n-butyl acrylate, and isobutyl acrylate.

14. The laminated structure of claim 1 wherein the antimony oxide is predispersed in a carrier polymer present in up to 30 weight percent based on antimony oxide plus carrier polymer.

15. The laminated structure of claim 1 wherein at least one non-adhesive layer is selected from the group consisting of plywood, plastic and plastic composite sheets and films, kraft paper, and metal sheets and foils.

16. The laminated structure of claim 15 used as a building construction laminate.

17. The laminated structure of claim 15 used as packaging for electronic goods.

* * * * *